United States Patent [19]

De Luca et al.

[11] 3,907,843

[45] Sept. 23, 1975

[54] 1α-HYDROXYERGOCALCIFEROL AND PROCESSES FOR PREPARING SAME

[75] Inventors: Hector F. De Luca, Madison; Heinrich K. Schnoes, Waunakee; Hing-Yat Lam, Madison, all of Wis.

[73] Assignee: Wisconsin Alumni Research Foundation, Madison, Wis.

[22] Filed: June 14, 1974

[21] Appl. No.: 479,224

[52] U.S. Cl. ............................................. 260/397.2
[51] Int. Cl.² ..................................... C07J 9/00
[58] Field of Search ................................. 260/397.2

[56] References Cited
UNITED STATES PATENTS 3,585,221  6/1971  De Luca ......................... 260/397.2
3,833,622  9/1974  Babcock et al. .................. 260/397.2
3,847,955  11/1974  De Luca .......................... 260/397.2

*Primary Examiner*—Elbert L. Roberts
*Attorney, Agent, or Firm*—Howard W. Bremer

[57] ABSTRACT

1α-Hydroxyergocalciferol and method for preparing same. The compound is characterized by antirachitic activity comparable to that of the D-vitamins and finds application in situations where the D-vitamins are now being used.

2 Claims, No Drawings

1α-HYDROXYERGOCALCIFEROL AND PROCESSES FOR PREPARING SAME

The invention described herein was made in the course of work under a grant or award from the Department of Health, Education, and Welfare.

This invention relates to a compound which exhibits vitamin D-like activity.

More specifically, this invention relates to a derivative of vitamin $D_2$.

The D vitamins, vitamin $D_2$ and $D_3$, have long been used in situations where adjustments or corrections involving calcium metabolism are being sought. Among the most widely known of such correctional uses is the application of vitamin $D_3$ for its antirachitic effect.

A derivative of vitamin $D_2$ has now been found which is characterized by antirachitic activity comparable to that exhibited by vitamin $D_3$. This derivative has been identified as 1α-hydroxyergocalciferol and is obtained in accordance with the following procedure.

SYNTHESIS

In the following description the numbered designations of the compounds are identical with like designations in the process schematic:

Isoergosterone (1) (m.p. 105°–106°, $\lambda_{max}$280nm) was prepared from ergosterol by the method described in Shepherd et al, J. Amer. Chem. Soc. 77, 1212 (1955). To a solution of isoergosterone in 80 ml t-butanol and 1 ml acetic acid, 1.5 g $SeO_2$ was added, and the mixture was refluxed under nitrogen for 16 hours. The solvent was then evaporated in vacuo, the residue was redissolved in 150 ml ethanol and 7 ml of 28% aqueous $(NH_4)_2S$ was added. This solution was refluxed for 1½ hours and then kept at room temperature overnight. After evaporation of the solvent under reduced pressure and addition of $CHCl_3$ the resulting slurry was filtered through a short $Al_2O_3$-column to remove the Se powder. Concentration of the filtrate and separation of the products on a silicic acid column gave ca. 1.5 g (30% yield) of 1,4,6,25-ergostatetraen-3-one (2) of satisfactory purity which was identified by the following spectral properties: UV (EtOH)$\lambda_{max}$301, 257, 225 nm; nmr ($CDCl_3$) $\delta$5.22 (2H, $m$, C22,23), $\delta$5.90–6.45 (4H, multiplets, C2,4,5,6) $\delta$7.12 (1H, $d$, J = 10 Hz, C1).

To a solution of 1.5 g of the tetraenone (2) in 200 ml MeOH and 50 ml dioxane, 1 ml 10% NaOH and 6 ml 30% $H_2O_2$ were added. The reaction mixture was kept at room temperature overnight. The solvent was then evaporated under reduced pressure (with simultaneous addition of water), and the product that separated was collected by suction filtration, washed with water and dried in vacuo. The solid obtained was redissolved in $CHCl_3$ and applied to a column of 100 g silicic acid prepared in $CHCl_3$. Elution with $CHCl_3$ gave 1.2 g (77%) of 1α,2α-epoxy-4,6,22 ergostatriene-3-one (3) which, upon crystallization from methanol/acetone yielded material having the following characteristics: m.p. 143°–145°; nmr ($CDCl_3$) $\delta$ 3.23(1H, $dd$, J≈ 4 and 2 Hz, C2), 3.60(1H, $d$, J = 4 Hz, C1), 5.22 (2H, $m$, C22,23); 5.67(1H, broad singlet, C4); 6.10(2H, $s$, C6,7); mass spectrum, m/e (relative intensity) 408($M^+$, 17) 392 (5), 365 (4) 338 (4), 284 (100, M-sidechain +H), 171 (38), 125 (52).

A solution of 600 mg of the epoxide (3) in 70 ml freshly distilled THF was added (all at once) to 70 ml liquid ammonia containing 2 g of 30% lithium dispersion. The reaction mixture was refluxed for 10 minutes and then 15 g $NH_4Cl$ was added in small portions over a 20 minute period. After evaporation of the ammonia, water was added, and the mixture was extracted with ether. The ether layer was dried over $Na_2SO_4$, evaporated, and the residue was applied to a 120 g silicic acid column poured as a slurry in 20% ether in Skellysolve B. The column was eluted with 100 ml of 20% ether in Skellysolve B (straight run aliphatic naphthas (essentially normal hexane) derived from petroleum oil having a boiling range of 60°–68°C, marketed by Skelly Oil Co.) followed by 250 ml of 50%, and 250 ml of 70% ether in Skellysolve B and finally with 250 ml of ether, 250 ml of 20% ethyl acetate in ether and 200 ml of 50% ethyl acetate in ether. 12 ml fractions were collected. Crystallization of the material in tubes 69–90 (200 mg) from Skellysolve B and ethyl acetate gave the dihydroxy compound, 1α-hydroxy-7,8-dihydroergosterol (4) having the following characteristics: m.p. 180°–182°; nmr ($CDCl_3$) $\delta$ 3.85(2H, broad multiplet, C1,3); 5.22(2H, $m$, C22,23), 5.60 (1H,$m$, C6); mass spectrum, m/e (relative intensity): 414 (68, $M^+$), 396 (100), 378 (11), 363 (8), 289 (26) 271 (40) 253 (38).

200 mg. of the dihydroxy compound (4) was acetylated by dissolving in pyridine (10 ml) and acetic anhydride (10 ml). The acetylation was done at 80°C for 24 hours. The reaction was extracted with diethylether and $H_2O$ (pH-4 with $H_2SO_4$). The ether phase was collected and the aqueous phase was extracted twice and diethylether. The ether phases were combined and dried under nitrogen gas. The collected material was subjected to silicic acid column chromatography and 130 mg (54% yield) of the diacetate, 1α-acetoxy-7,8-dihydroergosteryl acetate (5) was recovered. This compound had the following characteristics: nmr ($CDCl_3$) $\delta$ 2.03 (6H, singlets, C1, 3-OAc); 5.1 (4H, $m$, C1,3 and C22,23); 5.56 (1H, $m$, C6); mass spectrum, m/e (relative intensity): 378 (77, M-60-60), 363 (5), 335 (4), 253 (14), 157 (27), 125 (29), 118 (100).

To 100 mg of the $\Delta^5$-compound (5) dissolved in 6 ml Skellysolve B, at 70°C, 4.3 mg of dibromantin (N,N'-dibromodimethylhydantoin) (1.5 × mole Br) was added. The solution was refluxed with stirring for 15 minutes then cooled in an ice bath and filtered. The filtrate was taken up in 2 ml xylene and added dropwise to a solution of 0.2 ml trimethylphosphite and 1 ml xylene preheated to 135°C. The reaction mixture was kept at 135°–140° C for 2 hours. After evaporation of the solvent under reduced pressure the residue was chromatographed on $AgNO_3$-impregnated silicic acid. Elution with 5% ether in Skellysolve B gave ca. 10 mg (10% yield) of 1α-hydroxyergosteryl diacetate (6) having the following characteristics: UV (ethanol)-$\lambda_{max}$295, 283, 272 nm; mass spectrometry, m/e (relative intensity): 496 (2, $M^+$), 436 (11), 376 (100 ), 251 (26).

A solution of 4 mg of the $\Delta^{5,7}$-compound (6) in 200 ml ether was irradiated (Hanovia high pressure quartz mercury vapor lamp) at 0°C for 2 minutes in accordance with the procedure of Blunt and DeLuca (Biochemistry 8:671, 1969). The products were separated into two fractions on $AgNO_3$-impregnated silicic acid. The nonpolar fraction contained the desired 1α,3β-diacetoxy previtamin $D_2$(7), exhibiting UV absorption at $\lambda_{max}$260 nm, and $\lambda_{min}$ = 235 nm. After heating in 95% EtOH at 80° C for 2 hours the absorption shifted to $\lambda_{max}$ 265 nm, $\lambda_{min}$ 228 nm and the absorbance was enhanced indicating conversion of the previtamin to the vitamin skeleton. Two drops of 0.9 N KOH in MeOH were then added and the mixture was kept at 60°C for 10 minutes. Evaporation of the ethanol under a stream of $N_2$, addition of $H_2O$ and extraction with $CHCl_3$, drying ($Na_2SO_4$) and evaporation of $CHCl_3$ solvent gave a residue which was applied to a 20 g Sephadex LH-20 column (Sephadex LH-20 is a hydroxypropyl ether derivative of a polydextran marketed by Pharmacia Fine Chemicals, Inc., Piscataway, N.J.) in $CHCl_3$: Skellysolve B (1:1) and eluted with the same solvent. Collection of 3.2 ml fractions gave, in fractions 25–33, .523 g of pure 1α-hydroxyergocalciferol (8) exhibiting the following characteristics: ultraviolet spectrum $\lambda_{max}$ 265 nm, $\lambda_{min}$ 228 nm; mass spectrum, m/e (relative intensity), 412 ($M^+$, 24), 394 (19), 376 (10), 287 (12), 269 (15), 251 (14), 152 (35), 135 (71), 134 (100). NMR ($CDCl_3$), δ 6.40 (1H, d, J = 11 $H_3$), 6.02 (1H, d, J = 11 $H_3$), 5.33 (1H broad singlet, C-19), 5.20 (2H, m, C-22,23), 5.01 (1H, broad singlet, C-19).

It is to be understood that in the aforedescribed procedure various changes can be made in the amounts and kinds of solvents which can be utilized and that some variations in reaction temperatures and amounts of reactants can be made without departing from the scope and spirit of the invention. Also, other methods may be used to separate various of the desired components where such alternative methods are obvious to those skilled in the art.

PROCESS SCHEMATIC

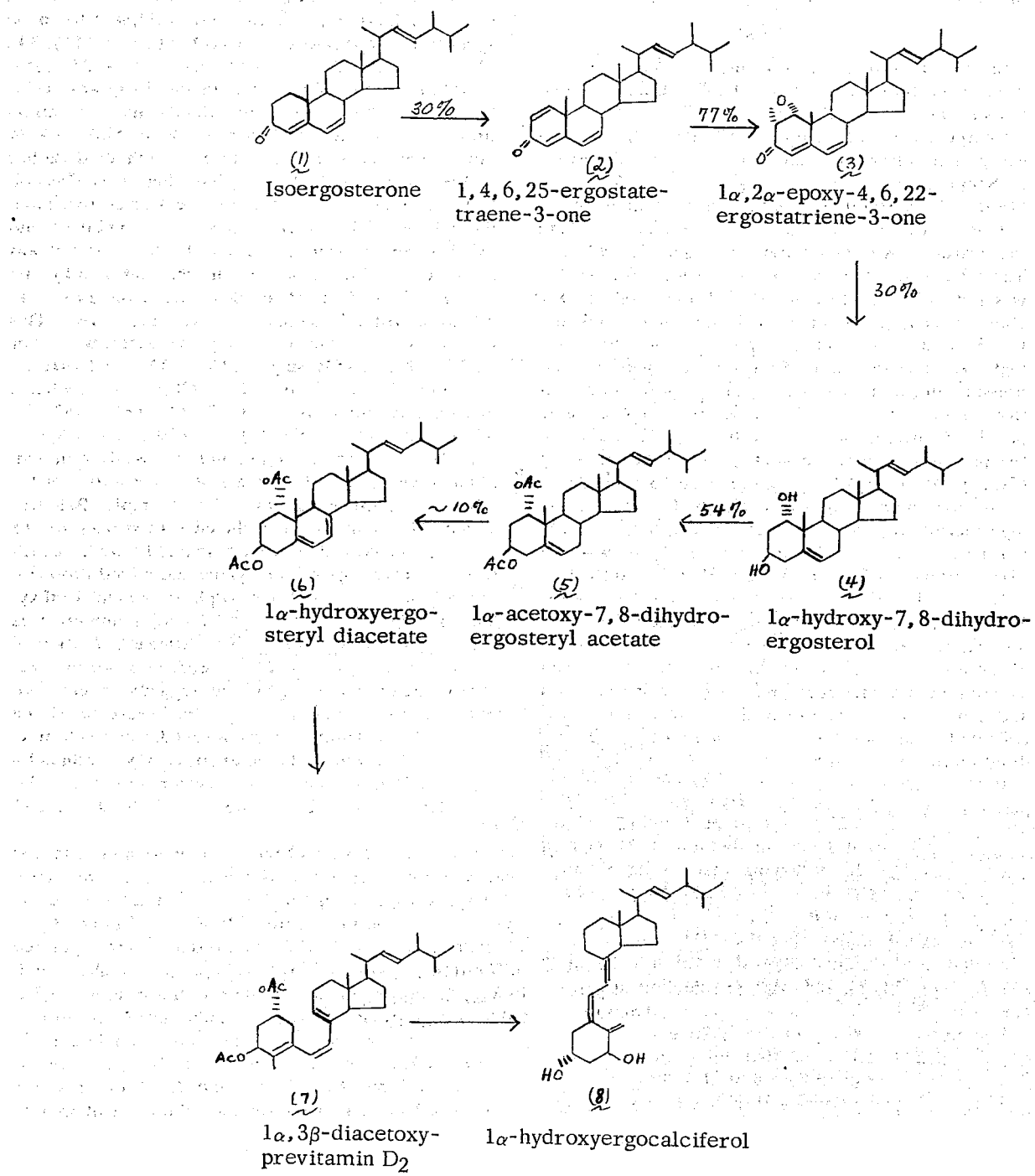

(1) Isoergosterone
(2) 1,4,6,25-ergostatetraene-3-one
(3) 1α,2α-epoxy-4,6,22-ergostatriene-3-one
(6) 1α-hydroxyergosteryl diacetate
(5) 1α-acetoxy-7,8-dihydroergosteryl acetate
(4) 1α-hydroxy-7,8-dihydroergosterol
(7) 1α,3β-diacetoxy-previtamin $D_2$
(8) 1α-hydroxyergocalciferol

BIOLOGICAL ACTIVITY

Biological activity was determined by the antirachitic line test assay described in U.S. Pharmacopoeia, 14th Revision [Mack Publishing Co., Easton, Pa. (1955)] with samples given in 0.1 ml of propylene glycol with the results indicated in Table I below:

Table I

| Compound | Calcification Score | Antirachitic Activity I.U./$\mu$g |
| --- | --- | --- |
| None | 0 | 0 |
| Vitamin $D_3$ (0.075 $\mu$g) | 4.5 | 40 |
| 1$\alpha$-hydroxyergocalciferol | 3.7 | 35 |

A record series of line test assays was conducted in accordance with the U.S. Pharmacopoeia procedure referenced above except that the 1$\alpha$-hydroxyergocalciferol was injected at a level of 0.005 $\mu$g per day (0.05 ml) intraperitoneally in hydroxy propyl cellulose (prepared by Ben Venue Laboratories, Bedford, Ohio) for the first 5 days of the 7 day test period. The results obtained are shown in Table II below.

Table II

| Compound | Calcification Score | Antirachitic Activity I.U./$\mu$g |
| --- | --- | --- |
| None | 0 | 0 |
| vitamin $D_3$ (0.075 $\mu$g) | 4.57 | 40 |
| 1$\alpha$-hydroxyergocalciferol (0.025 $\mu$g) | 4.43 | 125 |

It is evident from the foregoing that 1$\alpha$-hydroxyergocalciferol exhibits an antirachitic effect substantially equivalent to vitamin $D_3$ and that with a different dosage protocol (i.e., daily and interperitoneally) exhibits about three times the antirachitic activity of vitamin $D_3$ administered in accordance with the standard U.S. Pharmacopoeia protocol.

Having thus described the invention, what is claimed is:

1. 1$\alpha$-Hydroxyergocalciferol.

2. A method of preparing 1$\alpha$-hydroxyergocalciferol which comprises:

treating isoergosterone with selenium dioxide and recovering 1,4,6,25-ergostatetraen-3-one from the reaction mixture;

epoxidizing the recovered tetraenone in alkaline hydrogen peroxide and recovering 1$\alpha$,2$\alpha$,-epoxy-4,6,22-ergostatrien-3-one;

reducing the said epoxy derivative with lithium in liquid ammonia and recovering 1$\alpha$-hydroxy-7,8-dihydroergosterol;

acetylating the said 1$\alpha$-hydroxy-ergosteral and recovering 1$\alpha$-acetoxy-7,8-dihydro-ergosteryl acetate;

subjecting the said diacetate to allyic bromination followed by treatment with trimethyl phosphite and recovering the 5,7-diene compound, 1$\alpha$-hydroxyergosteryl diacetate;

irradiating the said recovered 5,7-diene compound with ultraviolet light and recovering 1$\alpha$,3$\beta$-diacetoxy-previtamin $D_2$;

thermally isomerizing the said previtamin $D_2$ and recovering 1$\alpha$,3$\beta$-diacetoxy vitamin $D_2$; and hydrolyzing the said vitamin $D_2$ compound under basic conditions and recovering 1$\alpha$-hydroxyergocalciferol.

* * * * *